June 27, 1961 M. A. TREUHAFT 2,990,450
OUTLINE CODING SYSTEM OF PICTURE TRANSMISSION
Filed Sept. 3, 1958 10 Sheets-Sheet 1

INVENTOR.
MILTON A. TREUHAFT
BY
Wade Koontz AND
S. A. Stricklett
ATTORNEYS

June 27, 1961

M. A. TREUHAFT 2,990,450

OUTLINE CODING SYSTEM OF PICTURE TRANSMISSION

Filed Sept. 3, 1958

INVENTOR.
MILTON A. TREUHAFT
BY
ATTORNEYS

Fig. 7

INVENTOR.
MILTON A. TREUHAFT
BY
ATTORNEYS

Fig. 10

INVENTOR.
MILTON A. TREUHAFT

United States Patent Office 2,990,450
Patented June 27, 1961

2,990,450
OUTLINE CODING SYSTEM OF PICTURE TRANSMISSION
Milton A. Treuhaft, Livingston, N.J., assignor to the United States of America as represented by the Secretary of the Air Force
Filed Sept. 3, 1958, Ser. No. 758,874
6 Claims. (Cl. 178—6.8)

This invention relates to an outline coding system of picture transmission and particularly to a high speed system for transmitting only essential bits of picture information.

Heretofore a saving of band width-time product has been made by coding the picture so that the elements of scanned distance in the picture are replaced by the equivalent binary number code, since, in general the number of binary digits can be made to be less than the number of scanned picture elements, the saving results in transmitting the digits with binary code rather than the number of picture elements. However, the number of digits in the binary number system used must be chosen according to the statistics of the picture. Also, it turns out that for efficient transmission in general, the number of digits used in transmitting white elements must be different from the number of digits used in the transmission of black elements, depending on the statistics of the picture. In a typical case of the transmission of a radar map with 3% black, an 8 digit binary system is used in the white and a 4 digit binary in the black. Since the rate of transmission of the digits must be constant this means that there must be a faster scanning speed in the white portion of the picture than in the black portion, also, means to allow the receiver to distinguish between the 8 digit and 4 digit transmission must be provided. The whole system is complicated by the fact that a complete switch over must be made each time the scanning beam goes from white to black or vice versa.

A question arises whether this type of complete transmission and reproduction is necessary, or desirable. If the radar plots which are to be transmitted are carefully examined, it can be shown that a complete transmission is not necessary, but actually wasteful of information capacity. When the scanning beam passes from white to black the discontinuity is totally unexpected and according to the basic philosophy of information theory, contributes to the quantity of information of the picture. However, when the scanning beam passes from the black to the white there is another transition which by no means is unexpected as the normal width of the black line is known and the transmission of the second transition contributes very little if anything to the quantity of information of the picture and hence its transmission is unnecessary and inefficient.

In the present system the speed and efficiency of the transmitting system is increased by transmitting only the change from white to black and eliminating the change from black to white. In this system the writing beam of the receiver is actuated only at the transition from white to black or at the front edge or front outline of the black line, consequently, the receiver will print only the front outline of the black characters. However, it will be noted that while reading these received characters the eye tends to replace or fill in the body of the characters. The system may be further modified so that the writing beam will be energized for a predetermined interval to reinsert the character width and substantially reconstitute the black body of the line which was lost by eliminating the second or back edge transition.

It is accordingly an object of the invention to provide an improved picture transmission system.

It is a further object of the invention to provide a transmission system reproducing only the front outline of the black transmitted characters.

It is a further object of the invention to provide an outline transmission responsive system which reinstates to a large degree the black body of the black characters.

It is a further object of the invention to provide a character transmission system having high efficiency and a constant scanning speed.

Other objects and advantages of the invention will be apparent from the following detailed description taken in conjunction with the accompanying drawings, in which.

Figure 4:
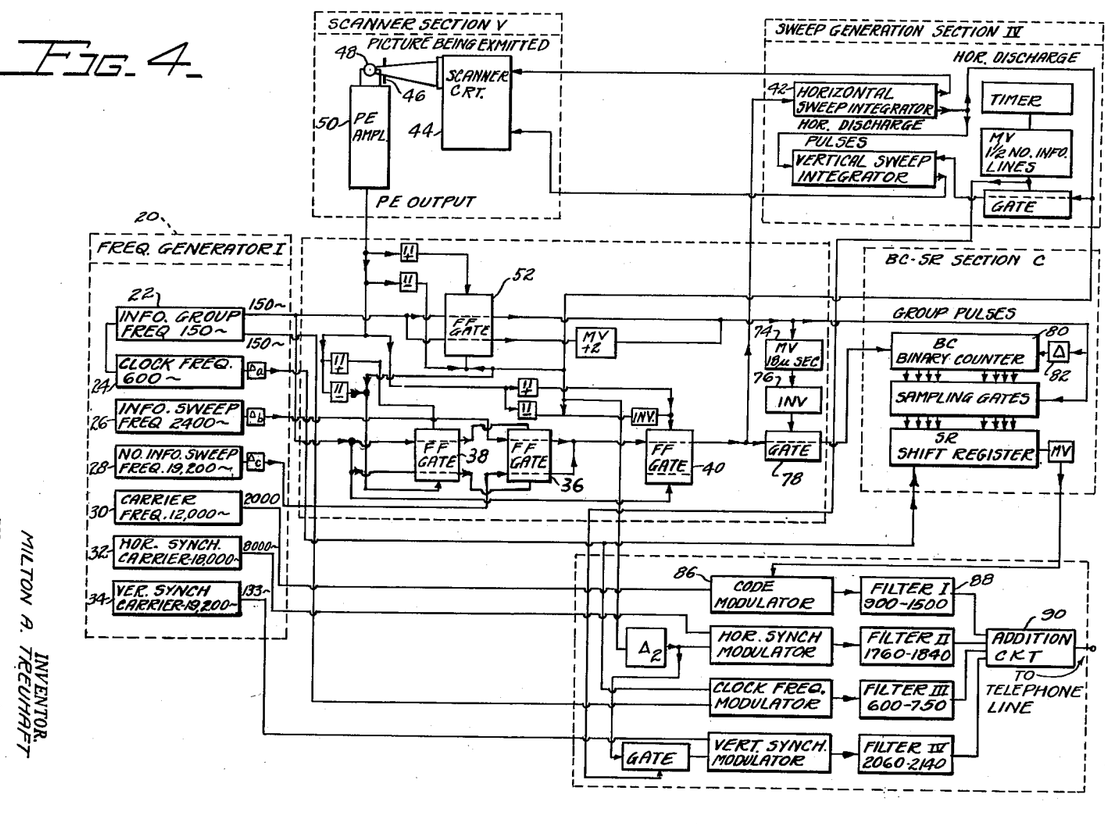
FIG. 4 is a block diagram of the previously used full character coded transmitter.

In a heretofore known full character coding system the transmitter FIG. 4 consists of a frequency generator assembly 20 having an information group frequency generator 22 having an output of 150 cycles, a normal clock frequency generator 24 having an output of 600 cycles, a pair of sweep frequency generators 26 and 28 with the information sweep generator 26 having output frequency of 2400 and a no-information sweep frequency generator 28 having an output frequency of 192200. A carrier frequency generator 30 having frequency of 12,000, a horizontal synchronizing carrier generator 32 having output frequency of 18,000 and a vertical synchronizing carrier generator 34 having output frequency of 2133 or 19,200 divided by 9.

Figure 1:
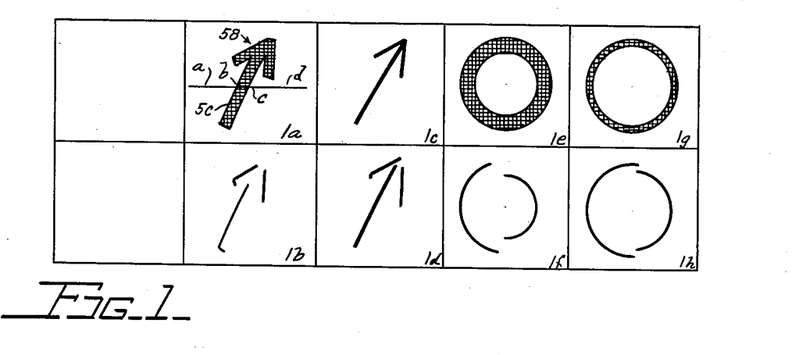
FIG. 1 is a reproduction of solid and outline characters showing the comparison between full and outline coded characters.
Figure 9:
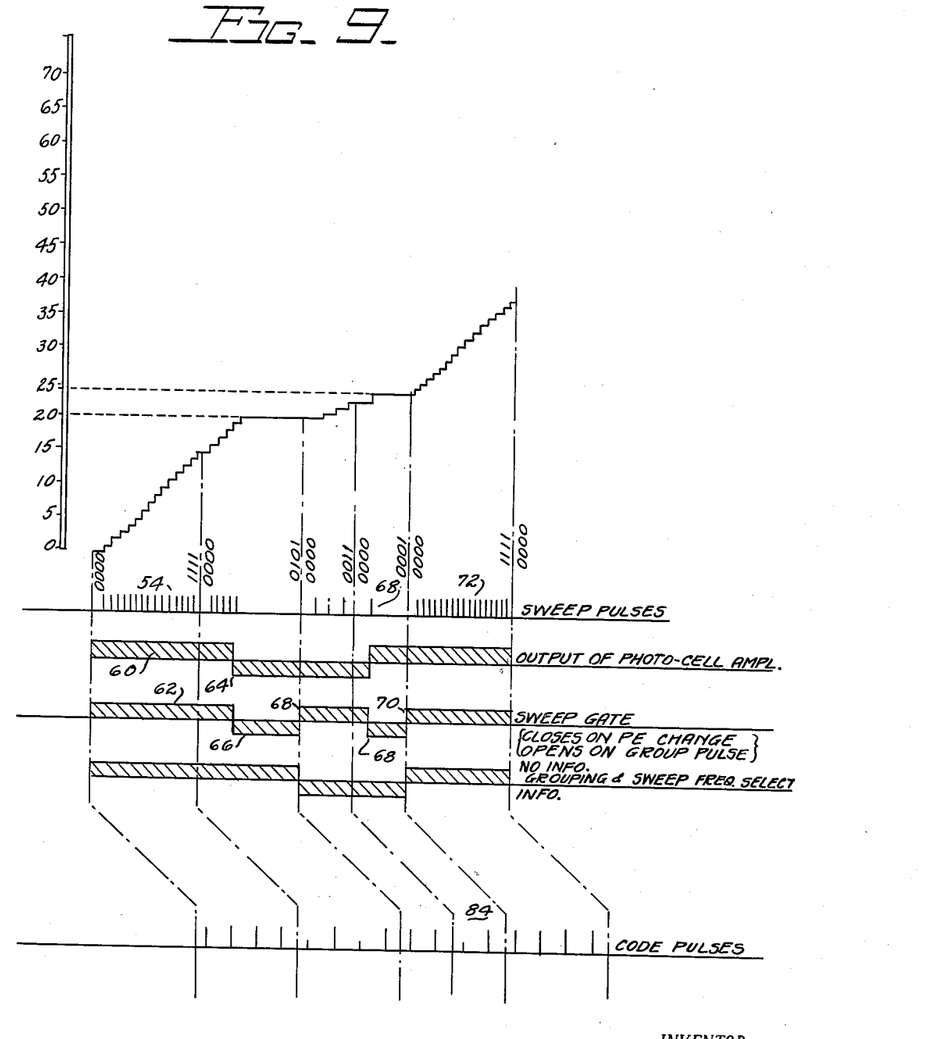
FIG. 9 is a timing diagram of the full character transmitter of the heretofore known system.

The no-information sweep frequency from generator is normally fed through a flip-flop gate 36 controlled by a flip-flop gate 38 to a sweep gate 40 to a horizontal sweep integrator 42. The horizontal sweep frequency is then fed to a scanner 44 which scans a picture 46, to be transmitted, to supply picture energy to the photocell 48 which operates through picture energy amplifier 50 to the flip-flop gates 38, 40 and 52 producing sweep pulses 54 along scan line a—b until point b of FIG. 1a is reached at which time the scanning beam encounters the front edge 56 of the character 58 herein indicated as a solid arrow. During the portion of the scan a to b the output 60 of the photocell amplifier 50 remains substantially constant, likewise the sweep gate 40 remains open as shown at 62. Upon the appearance of the change in picture energy the output of the photocell changes as shown at 64. The output of the amplifier 50 actuates gates 38, 52 and 40. Gate 38 switches from no-information frequency to information frequency while sweep gate 40 closes on the change of energy as shown at 66. The sweep gate 40 then opens on the group pulse application as shown at 68 to produce sweep pulses 69 and again closes on change of energy as shown at 70 when the scanning beam reaches the back side of the character or emerges from black to white after which it continues to operate as shown at 72. The multivibrator 74 fed from group 22 operates for 18μ seconds driving an inverter 76 to open the information gate 78 to supply the sweep frequencies to the binary control 80 where it combines sweep frequencies with the group pulse through a delay 82, resulting in code pulses 84 which are transferred to the code modulator 86 and through a filter 88 to the addition circuit 90 where it is combined with a horizontal synchronizing modulator frequency, a clock frequency modulator frequency and a vertical synchronizing modulator frequency to provide a modulation to the output carrier current.

Figure 5:
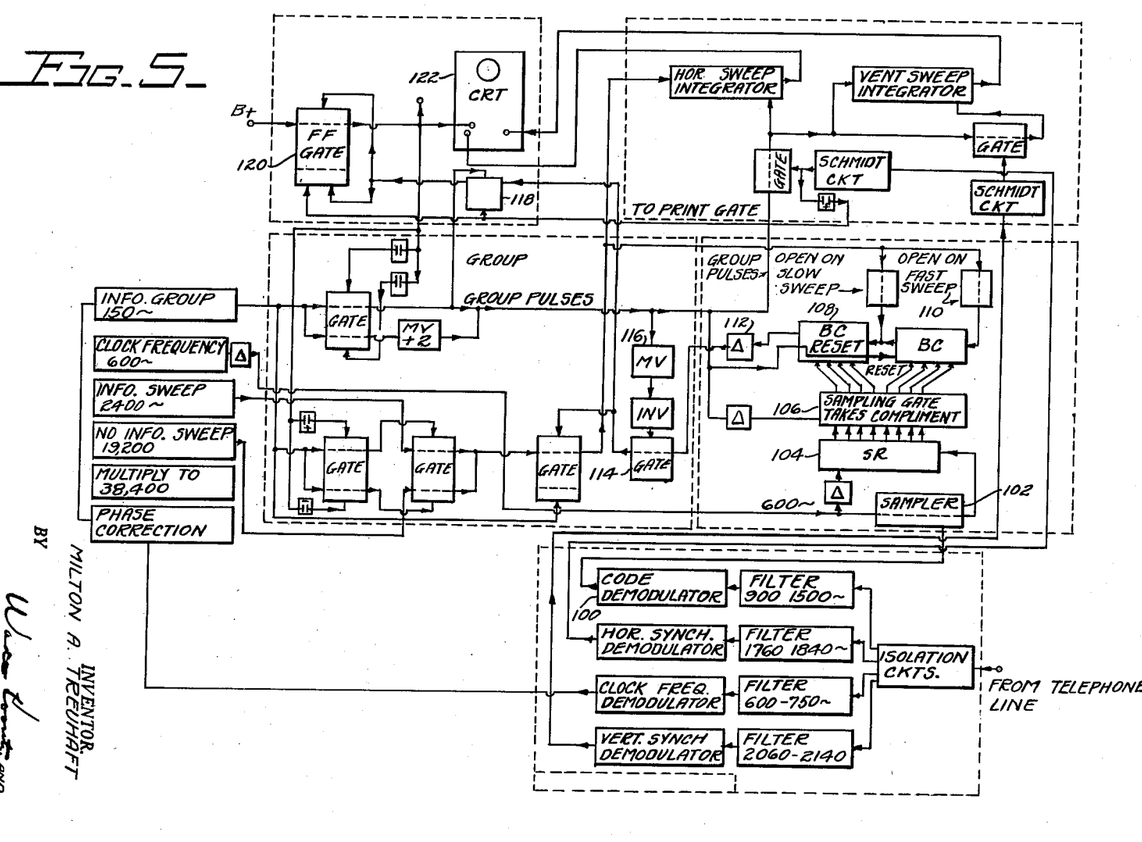
FIG. 5 is a similar block diagram of the previously used full character receiver.
Figure 6:
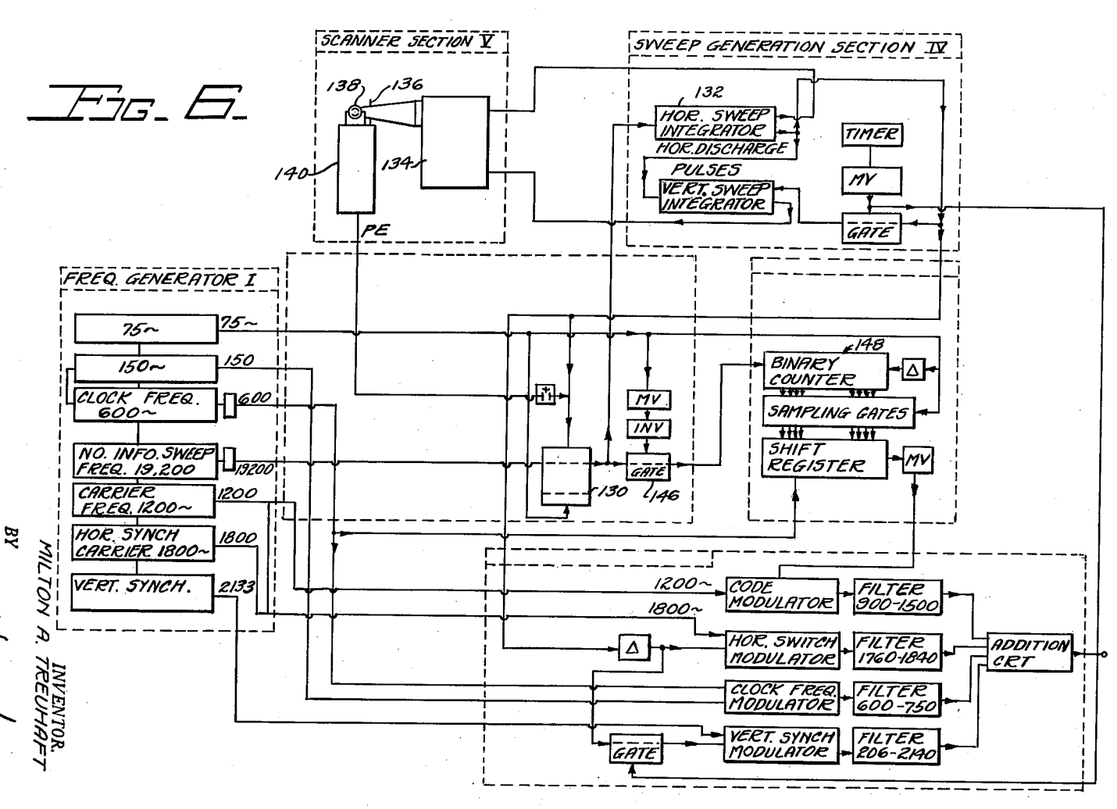
FIG. 6 is a block diagram of the front character outline coding transmitter.
Figure 10:
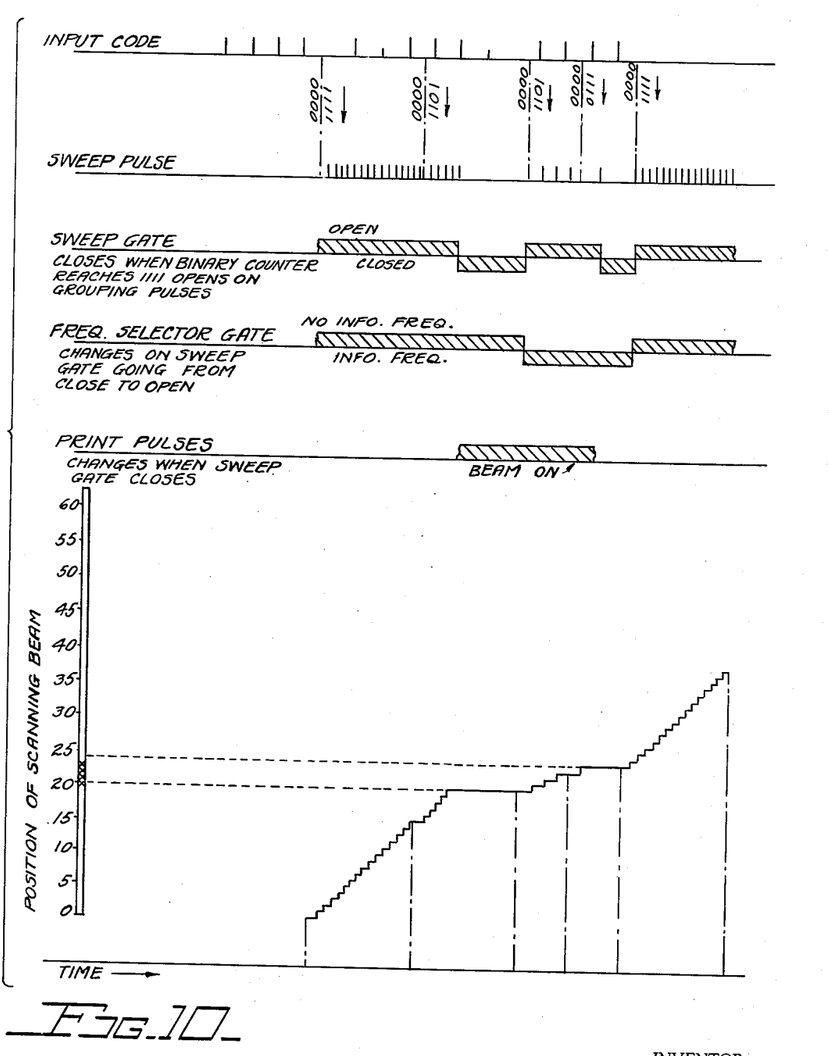
FIG. 10 is a timing diagram of the receiver of the full character transmitting system.
Figure 11:
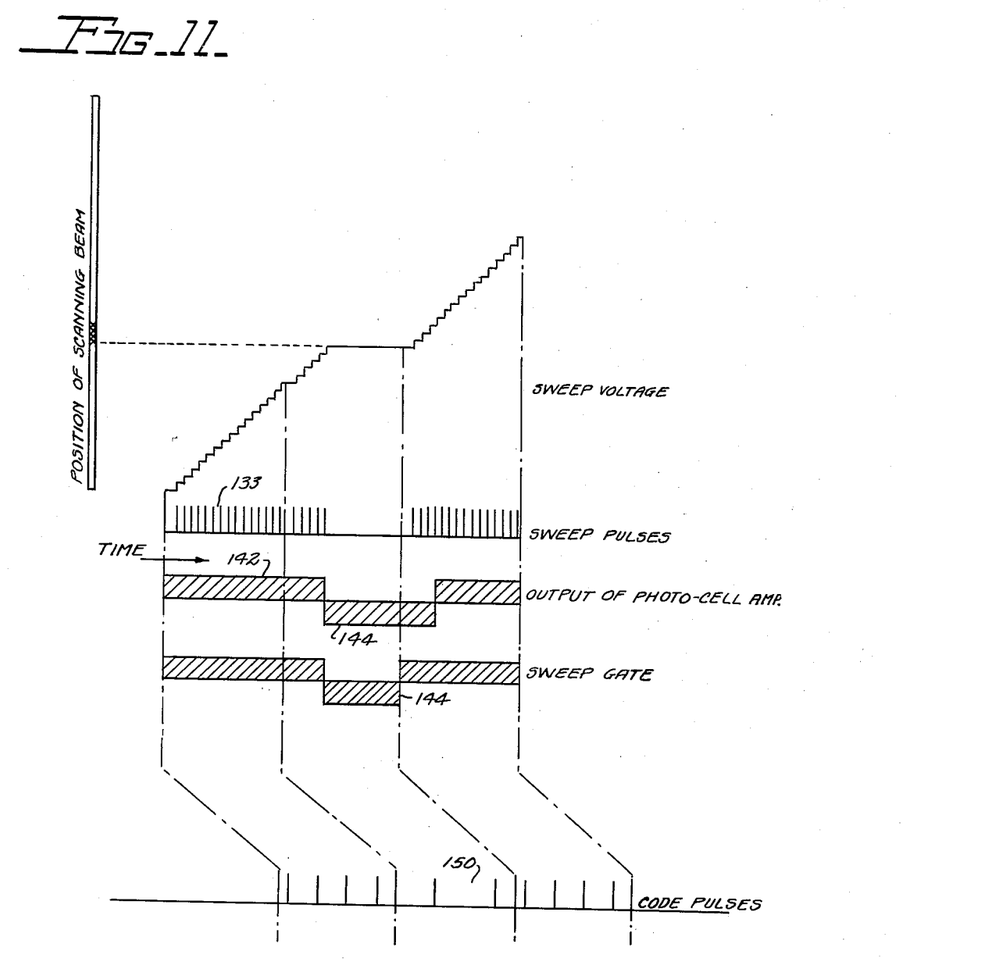
FIG. 11 is a transmitting timing diagram of the outline coding system.
Figure 12:
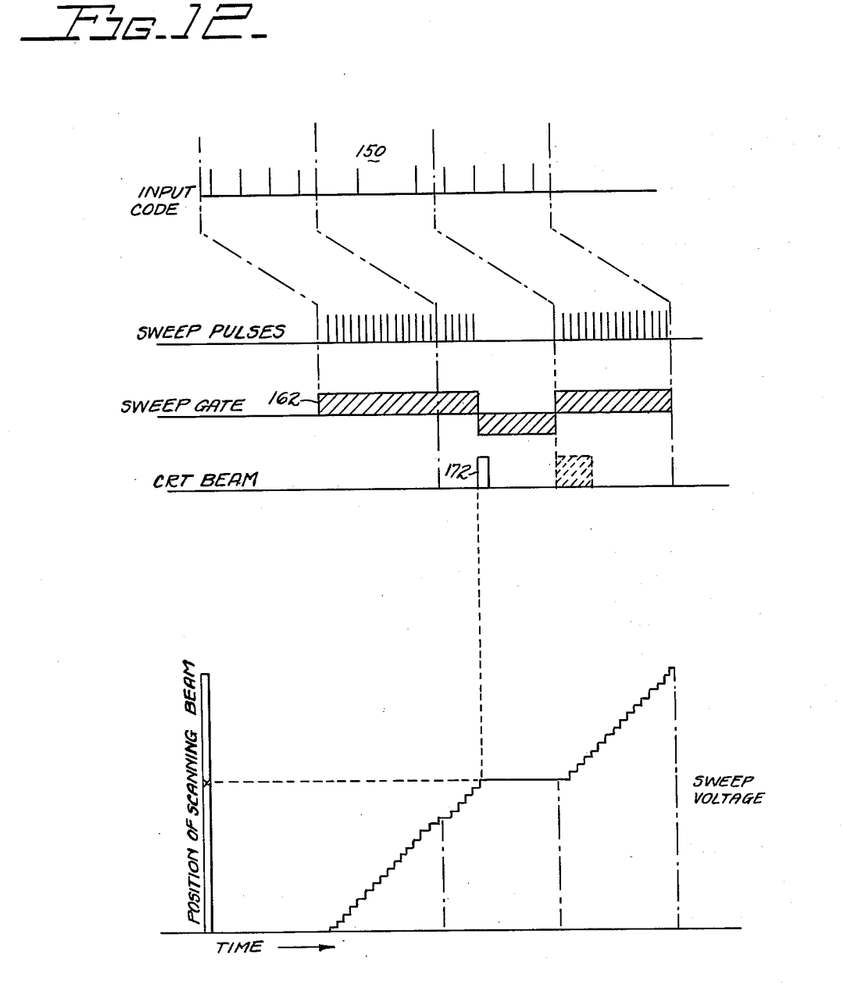
FIG. 12 is a receiver timing diagram of the outline coding system.

The output frequency from the transmitter is supplied to the receiver shown in FIG. 5 where it is separated from the carrier frequency by the code modulator 100 and fed to the sampler 102 which supplies the impulses to the shift register 104 through the sampling gate 106 to resets 108 and 110. Output pulse from reset 108 passes through delay circuit 112 through gate 114 controlled by motor vibrator 116 to group control flip-flop gate 118 to control gate 120 of cathode ray tube 122, thus producing complete solid characters as shown in FIGS. 1a, 1c, 1e and 1g.

Figure 7:
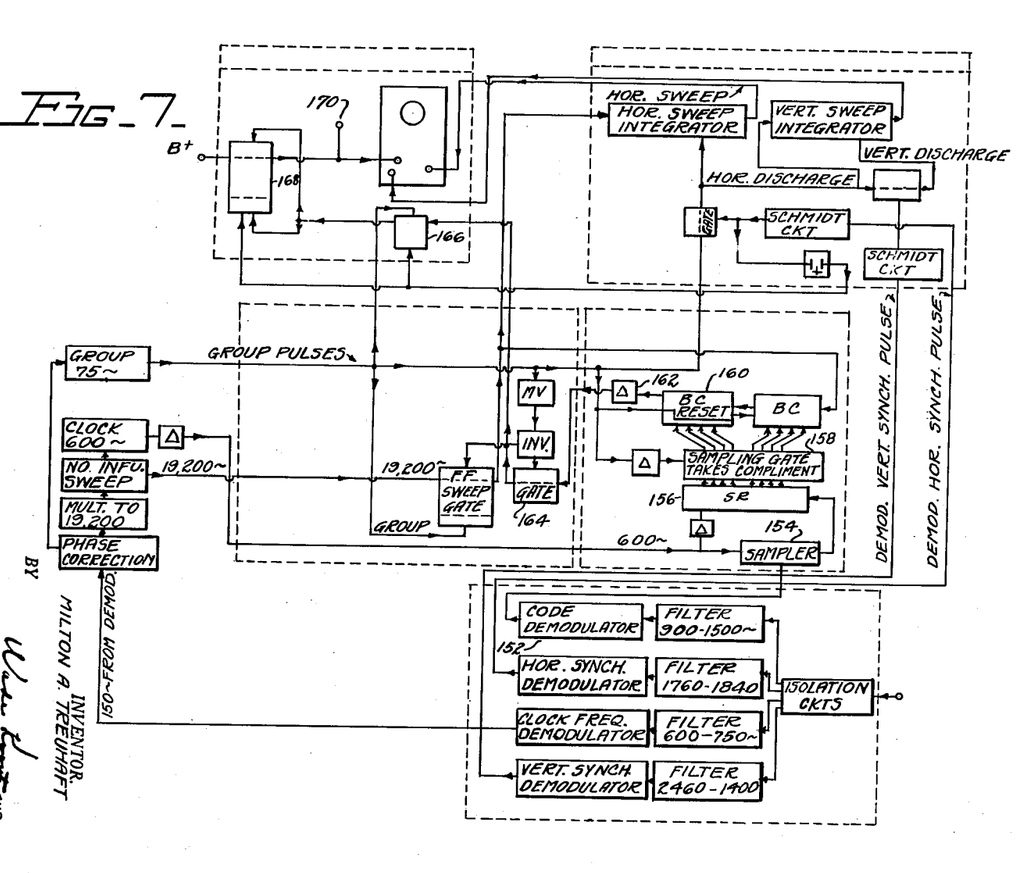
FIG. 7 is a block diagram of the front character outline receiver.

In the exemplary embodiment according to the invention a single sweep generator frequency of 19,200 cycles is supplied through a single sweep gate 130 to horizontal sweep integrator 132 which supplies sweep pulses 133 to the scanner cathode ray tube 134 which scans picture 136 to control phototube 138 in proportion of the picture energy. The amplifier 140 supplies output energy 142 until such time that the beam reaches point b of FIG. 1a at which time it gives output energy 144 which closes gate 130 to pass the impulses through gate 146 to the binary control 148 which provides the code impulses 150 until gate 130 is opened at 146 by the group pulse. The code 150 is then sent to code demodulator 152 of FIG. 7 and supplies code to sampler 154 which supplies a frequency to the shift register 156 which is controlled by a sampling gate 158 to apply energy to and through binary counter reset 160 the output 162 of which is fed through group control gate 166 to the flip-flop gate 168 which controls the energization of writing beam of the cathode ray tube 170. Since the beam 172 is energized only at the front edge of the character it will be seen that the results will show only the outlines as shown at FIG. 1b. It is noted that the eye tends to fill in the missing portions of the character so that substantially no information is lost. As shown at FIGS. 1c and 1d the narrower the actual body of the line the less information is lost. At FIGS. 1e and 1f a circular character is indicated, while substantially less information is transmitted the character is still recognizable. When character is relatively thin as shown at 1g and 1h substantially no information is lost.

Figure 2:
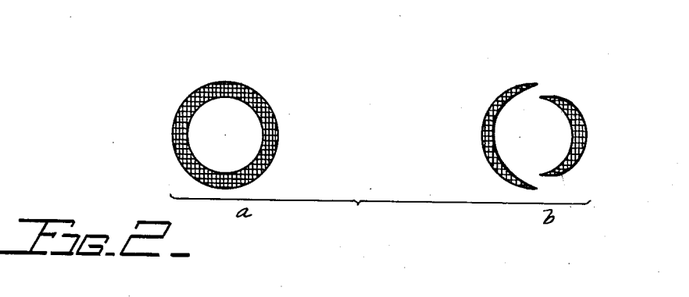
FIG. 2 is a comparison between a full outline coded character and a front outline coded character with reconstructed body width.

The transmitted letters or characters may be substantially reinstated by providing means for causing the writing beam to be energized for a time substantially corresponding to the thickness of the original character. This may be done in either of two ways, either by using a multivibrator having a period equal to the line width or by focusing the writing ray of the cathode ray tube into an oblong spot for a length substantially equal to the horizontal width of the line being reproduced. In FIG. 2 is shown a comparison between a full bodied letter as sent by the original or heretofore known transmission system and the same letter as reconstituted by the reinserted line width.

Figure 3:
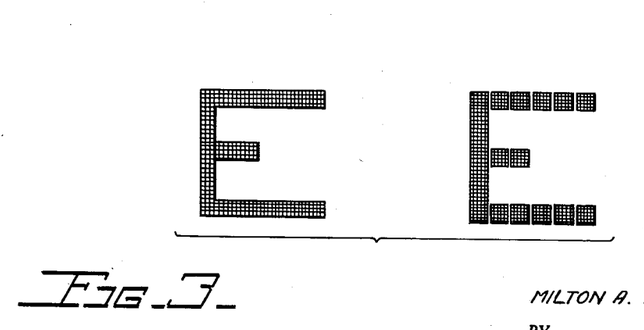
FIG. 3 is a modification showing reconstructed body width of horizontal character portions.
Figure 8:
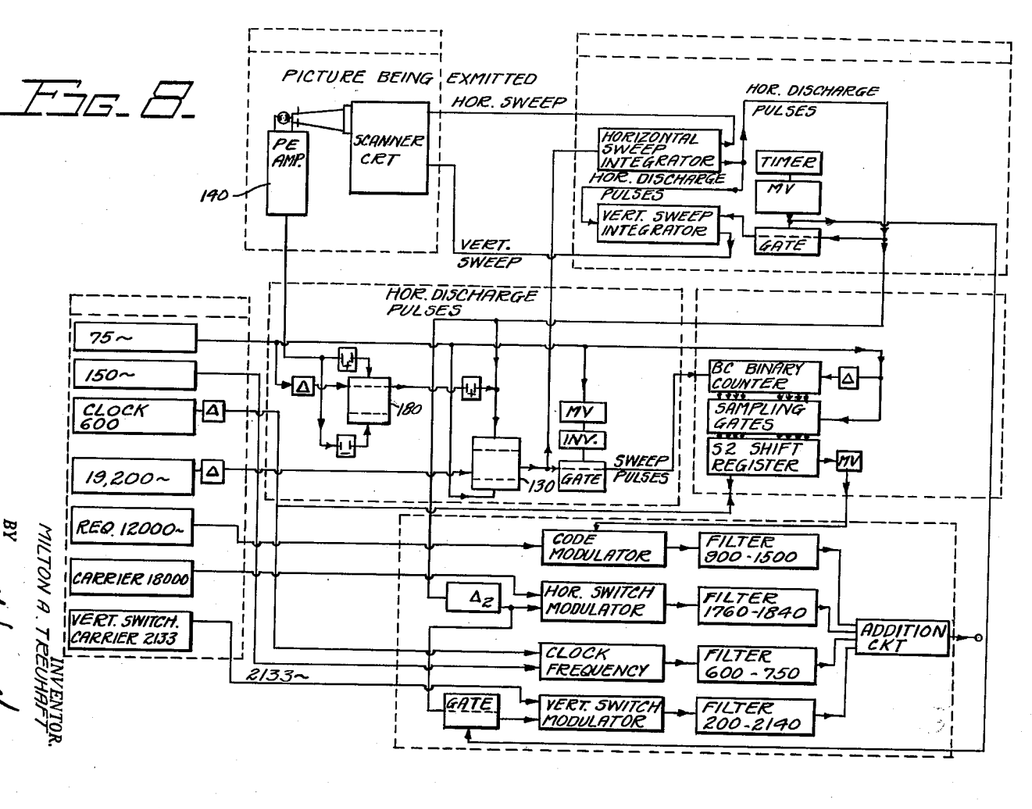
FIG. 8 is a block diagram of a modified front character outline transmitter having reinserted line width.

The utilization of outline coding loses certain details where the line is a horizontal continuation as shown in the letter E on FIG. 3a. This may be corrected in either of two manners, the original letter to be coded can be constructed as dotted lines in which event the outline coding will show each of the dots. As shown in FIG. 8 an auxiliary flip-flop gate 180 permits consecutive sampling of the output of the picture energy amplifier 140 so that if the line is of normal width the energy will be reversed and the gate 180 will close as in normal width characters but if the energy is still maintained the gate 180 will again open to produce a broken character as shown in FIG. 3d.

In the utilization of the improved transmission system according to the invention the apparatus scans continuously at a single speed and the sweep gates are opened and closed in response only to the transition from white to black so that high speed scanning is continuous. The receiver has the writing beam energized only at the occurrence of the front outline of the character. For most operations the front outline alone is of sufficient clarity to completely transmit the wanted information. The line width may be reinserted in some cases to reinforce the characters and in that type of transmittal in which some horizontal portions of the characters might be lost by the front line outline only, the utilization of the flip-flop gate to resample the picture energy prevents the loss of such horizontal lines.

For purposes of exemplification the particular embodiment of the invention has been disclosed and described according to the best present understanding thereof. However, it will be apparent to those skilled in the art that various changes and modifications can be resorted to without departing from the true spirit and scope of the invention.

What is claimed is:

1. An outline coding system of picture transmission comprising a constant speed scanning system for traversing a light beam over a picture having characters to be transmitted, a detector responsive to change in energy on transition of said beam from white to black, a gate responsive to the output of said detector to open on a transition from white to black, a source of group pulses, means for applying said group pulses to said gate to close the gate after opening, a binary coding system responsive to operation of said gate, a reproducer connected to be actuated by the output of said coding system, said reproducer including a code resetting system, a scanning writing beam, a gate connected to be controlled by the output of said resetting system, said gate controlling the energization of said writing beam.

2. For transmitting the intelligence of a picture having dark characters on a light background, an outline coding transmitting system comprising a constant speed scanner for traversing a beam over the picture to be transmitted, means responsive to passage of the beam from light to dark portions of the picture to provide a control pulse, a gate, means for impressing the control pulse on said gate to open the gate on transition of the beam from light to dark, a source of group pulses, connections for impressing said group pulses on said gate for closing said gate after opening, a binary coding system, means for applying the output of said gate on said coding system whereby the coding system is responsive to opening of said gate, a reproducer connected to receive the output of said coding system, said reproducer including a binary code resetting system to reconvert the binary code to the primary pulses, a scanning writing beam, a writing gate connected to receive the ouput of said resetting system, said writing gate being connected to control the intensity of said writing beam.

3. For transmitting the intelligence of a picture having dark characters on a light background, an outline coding transmitting system comprising a constant speed scanner for traversing a beam over the picture to be transmitted, means responsive to passage of the beam from light to dark portions of the picture to provide a control pulse, a gate, means for impressing the control pulse on said gate to open the gate on transition of the beam from light to dark, a source of group pulses, connections for impressing said group pulses on said gate for closing said gate after opening, a binary coding system, means for applying the output of said gate on said coding system whereby the coding system is responsive to opening of said gate, a reproducer connected to receive the output of said coding system, said reproducer including a binary code resetting system to reconvert the binary code to the primary pulses, a scanning writing beam, a writing gate connected to receive the output of said resetting system, said writing gate being connected to control the intensity of said writing beam, said writing gate remaining open for a predetermined interval to reinsert the original character width.

4. In a high speed picture transmission system for transmitting the intelligence of a picture having dark characters on a light background and having a binary coding system to convert picture intelligence pulses to binary code pulses for transmission, a binary code reset for receiving said code and reconverting to picture pulses, the improvement comprising a constant speed scanning system for scanning a picture to be transmitted, means responsive to the intensity of the scanning beam after scanning the picture to be transmitted, said means providing picture pulses at the front edges of the characters, an impulse gate connected to receive said picture pulses, said gate opening in response to picture pulses on transition of the scanning beam over the front edge of a character, a source of group pulses connected to said gate to close said gate after opening, a binary coding system, connections for passing the impulse from said gate to said binary coding system, a code resetting system connected to receive the output of said coding system, said resetting system reconverting said code to picture pulses, a writing gate connected to receive the output of said code resetting system, a constant speed scanning writing beam connected to be controlled by said writing gate whereby the intensity of the writing beam is responsive to the reconverted picture pulses.

5. In a high speed picture transmission system for transmitting the intelligence of a picture having dark characters on a light background and having a binary coding system to convert picture intelligence pulses to binary code pulses for transmission, a binary code reset for receiving said code and reconverting to picture pulses, the improvement comprising a constant speed scanning system for scanning a picture to be transmitted, means responsive to the intensity or the scanning beam after scanning the picture to be transmitted, said means providing picture pulses at the front edges of the characters, an impulse gate connected to receive said picture pulses, said gate opening in response to picture pulses on transition of the scanning beam over the front edge of a character, a source of group pulses connected to said gate to close said gate after opening, a binary coding system, connections for passing the impulse from said gate to said binary coding system, a code resetting system connected to receive the output of said coding system, said resetting system reconverting said code to picture pulses, a writing gate connected to receive the output of said code resetting system, a constant speed scanning writing beam connected to be controlled by said writing gate whereby the intensity of the writing beam is responsive to the reconverted picture pulses, means for maintaining the intensity of the writing beam for a predetermined interval to reinsert the character width in the received picture.

6. In a high speed picture transmission system for transmitting the intelligence of a picture having dark characters on a light background and having a binary coding system to convert picture intelligence pulses to binary code pulses for transmission, a binary code reset for receiving said code and reconverting to picture pulses, the improvement comprising a constant speed scanning system for scanning a picture to be transmitted, means responsive to the intensity of the scanning beam after scanning the picture to be transmitted, said means providing picture pulses at the front edges of the characters, an impulse gate connected to receive said picture pulses, said gate opening in response to picture pulses on transition of the scanning beam over the front edge of a character, a source of group pulses connected to said gate to close said gate after opening, a sampling gate responsive to picture energy to reopen said impulse gate if said scanning beam remains on dark for a predetermined interval whereby characters extending parallel to the scan path are reproduced, a binary coding system, connections for passing the impulse from said gate to said binary coding system, a code resetting system connected to receive the output of said coding system, said resetting system reconverting said code to picture pulses, a writing gate connected to receive the output of said code resetting system, a constant speed scanning writing beam connected to be controlled by said writing gate whereby the intensity of the writing beam is responsive to the reconverted picture pulses.

References Cited in the file of this patent

UNITED STATES PATENTS

| | | |
|---|---|---|
| 2,625,604 | Edson | Jan. 13, 1953 |
| 2,909,601 | Fleckenstein | Oct. 20, 1959 |